United States Patent [19]

Reinoehl

[11] Patent Number: 5,025,185
[45] Date of Patent: Jun. 18, 1991

[54] BUBBLE TRAP FOR EPOXY SEALANT IN A SUBMERSIBLE ELECTRIC MOTOR

[75] Inventor: Robert F. Reinoehl, Simi Valley, Calif.

[73] Assignee: Aquaria, Inc., Simi Valley, Calif.

[21] Appl. No.: 203,731

[22] Filed: Jun. 7, 1988

[51] Int. Cl.$^5$ .......................... F04D 1/00; H02K 5/04
[52] U.S. Cl. .................... 310/87; 417/423.3; 29/596
[58] Field of Search ............ 310/88, 87; 29/596; 417/423.3; 119/5; 210/416.2

[56] References Cited

U.S. PATENT DOCUMENTS

| | | | |
|---|---|---|---|
| 2,615,068 | 10/1952 | Radice | 310/87 |
| 2,636,137 | 4/1953 | Andrus | 310/87 |
| 3,075,250 | 1/1963 | Strohm et al. | 29/596 |
| 3,135,885 | 6/1964 | Maynard | 310/87 |
| 3,685,926 | 8/1972 | Blum | 417/423.3 |
| 3,979,822 | 9/1976 | Halm | 29/596 |

FOREIGN PATENT DOCUMENTS

| | | | |
|---|---|---|---|
| 2248973 | 5/1973 | Fed. Rep. of Germany | 310/87 |
| 0035546 | 2/1984 | Japan | 29/596 |
| 0213268 | 12/1984 | Japan | 29/596 |
| 1096478 | 12/1967 | United Kingdom | 310/87 |

Primary Examiner—Carlton R. Croyle
Assistant Examiner—David W. Scheuermann
Attorney, Agent, or Firm—Spensley Horn

[57] ABSTRACT

A bubble trap for a submersible pump is provided that is placed above the stator assembly of the motor and within sealant material located around the coils of the motor. The bubble trap helps prevent moisture from working its way throught the sealant material through the coils by traveling through bubbles in the sealant material. The bubble trap improves product safety and quality and reduces production rejects, thereby improving production time and efficiency.

11 Claims, 2 Drawing Sheets

BUBBLE TRAP FOR EPOXY SEALANT IN A SUBMERSIBLE ELECTRIC MOTOR

BACKGROUND OF THE INVENTION

1. Field of the Invention

This invention relates to pumps and, more particulary, to submersible pumps.

2. Description of Related Art

Submersible pumps are designed to be immersed in the liquid that they will be pumping. One application of such pumps, for example, is in conjunction with aquarium undergravel filters. In an aquarium, it is necessary to treat the water to remove particulates and toxic chemicals and gases and to replenish the oxygen supply throughout the aquarium tank water. In undergravel filtration, a porous support plate is positioned slightly above the bottom of the aquarium tank. A layer of filtration material, such as gravel, is deposited on the support plate, forming a filtration layer. The aquarium water is circulated downwardly through the filtration material and porous support plate so that waste products in the water will be collected by the filtration material. After water is forced downwardly through the filtration layer, it is carried upward in a conduit passing through the filtration layer. At the top end of the conduit, the water is discharged back into the aquarium tank. A submersible water pump is placed in the aquarium tank to provide this flow of water.

Typically, such submersible pumps comprise a rotating impeller, the impeller being attached to the rotor of an electric motor. The pump typically includes a motor housing, which is immersed in the aquarium tank. The motor housing includes a motor cavity, which accepts the motor coils comprising a stator assembly. An impeller housing receives the impeller and is attached to the motor housing. Attached to the impeller housing are an intake conduit for drawing in aquarium water through the undergravel filter and also a discharge conduit for directing the flow of water outwardly from the pump.

Because the motor housing is submerged in the aquarium tank, there is a danger that aquarium water may penetrate through the motor housing into the motor cavity and reach the motor coils, thereby destroying the motor. Therefore, it is common practice to fill the motor cavity space between the motor housing and the coils with a non-porous sealant material, or pottant, such as epoxy. In assembly, the coils are placed within the motor cavity, which is then filled with the epoxy sealant material. The epoxy pottant eventually cures into a hardened state. In this manner, a watertight seal is created around the coils. The curing time varies with the pottant material and the curing conditions.

Although the sealing method described above is generally effective, it does not provide complete assurance of obtaining a watertight seal. While the epoxy is curing, bubbles may form in the epoxy due to air around the coils being trapped within the motor cavity when the epoxy was poured. As the epoxy cures, the bubbles naturally float upward toward the surface of the epoxy. The bubbles may form a path or series of voids from the coils to the outside surface of the epoxy, allowing moisture to work its way from bubble to bubble toward the motor coils. Because of this problem, after the epoxy is cured, it must be inspected for bubble formation, resulting in some rejections for defects. It would be desirable to provide a submersible pump that is free of the safety and production problems due to bubble formation in the sealant material.

SUMMARY OF THE INVENTION

The present invention provides a submersible pump that virtually eliminates the chance of moisture working its way to the motor coils through bubble paths in the cured sealant material. The present invention accomplishes this by providing a bubble trap, or cap, that is placed above the motor coils and beneath the top surface of the epoxy. The trap extends across the lateral cross-section of the motor housing above the coils and is covered by the sealant material. The presence of the bubble trap prevents the bubbles from forming a trail of voids in the sealant material from the motor coil to the outer surface of the sealant material. Defects are therefore minimized in an extremely simple and cost effective manner.

The bubble trap comprises a generally planar dome and may be constructed from any material that will prevent the passage of rising bubbles in uncured sealant material for the duration of curing time. Acceptable trap materials include, for example, plastic, metal, rubber, cardboard, and combinations thereof. The dome should extend laterally enough to prevent bubbles from passing around it during curing. Preferably, the edge of the bubble trap substantially conforms to the shape of the motor housing interior around the sealant material when viewed in plan. The lateral extent of the trap will vary depending on the pottant material selected and the curing time required.

The novel features that are believed to be characteristic of the invention, together with further objectives and advantages thereof, will be better understood from the following detailed description considered in connection with the accompanying drawings. It should be expressly understood, however, that the drawings are for purposes of illustration and description only and are not intended as a definition of the limits of the invention. The scope of the invention is best determined by reference to the appended claims.

DETAILED DESCRIPTION OF THE DRAWINGS

Figure 1:
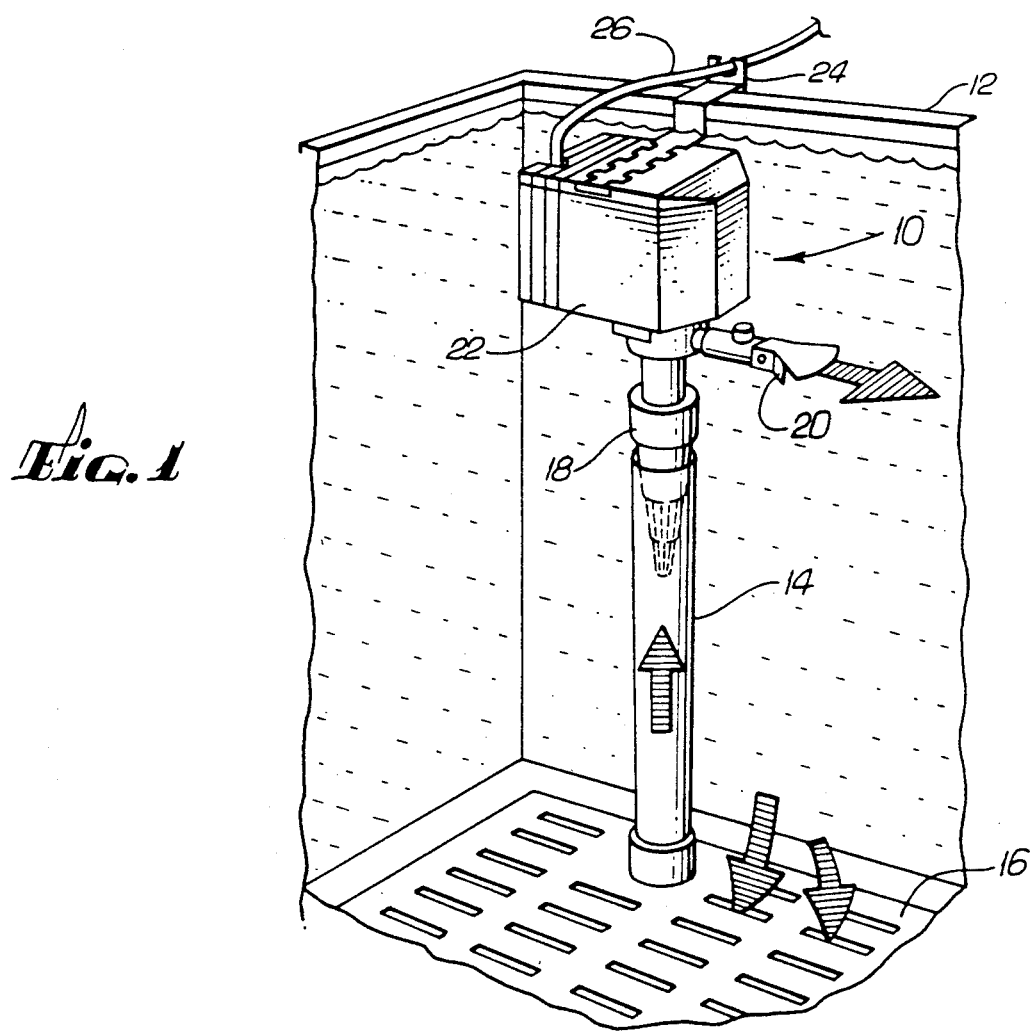
FIG. 1 shows a perspective view of a submersible pump immersed in an aquarium tank.

FIG. 1 shows a submersible pump 10 placed within the water of an aquarium tank 12. An intake tube 14 draws water from the aquarium tank through an undergravel filter layer 16 and carries it up through the intake tube 14 into the impeller housing 18 and out through a diffuser 20 back into the aquarium tank. The motor housing 22 is submerged within the aquarium tank water and is suspended from the aquarium 12 by a mounting bracket 24. A power cord 26 provides electrical power to the pump and extends from the motor housing 22 to an electrical source outside the aquarium tank.

Figure 2:
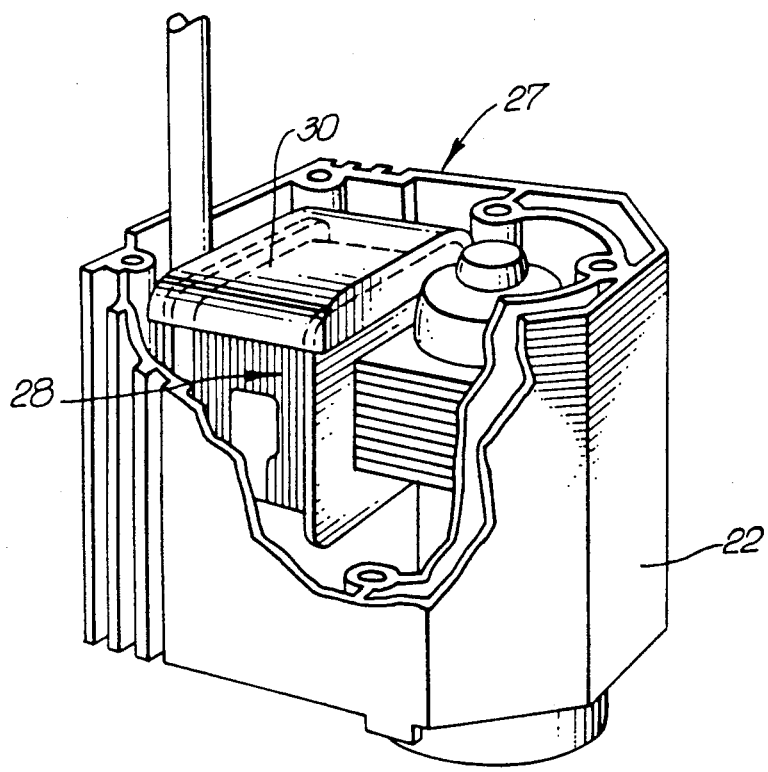
FIG. 2 shows a cut-away perspective view through the motor housing of a submersible pump incorporating the bubble trap of the present invention.

FIG. 2 shows a cut-away view of the motor housing 22 showing the pump motor contained within the motor housing. The motor housing 22 defines a motor coil cavity 27, which accepts the coils 28, or stator assembly, of a pump motor. The bubble trap 30 of the present invention is located above the coils. In the preferred embodiment, the bubble trap is located approximately ⅛ inch from the top edge of the coils, with the remainder of the cavity 27 above the cap 30 being filled with a sealant material. For clarity, the sealant material is not illustrated. Thus, the stator assembly of the pump motor and the bubble trap are actually surrounded by sealant material.

Figure 3:
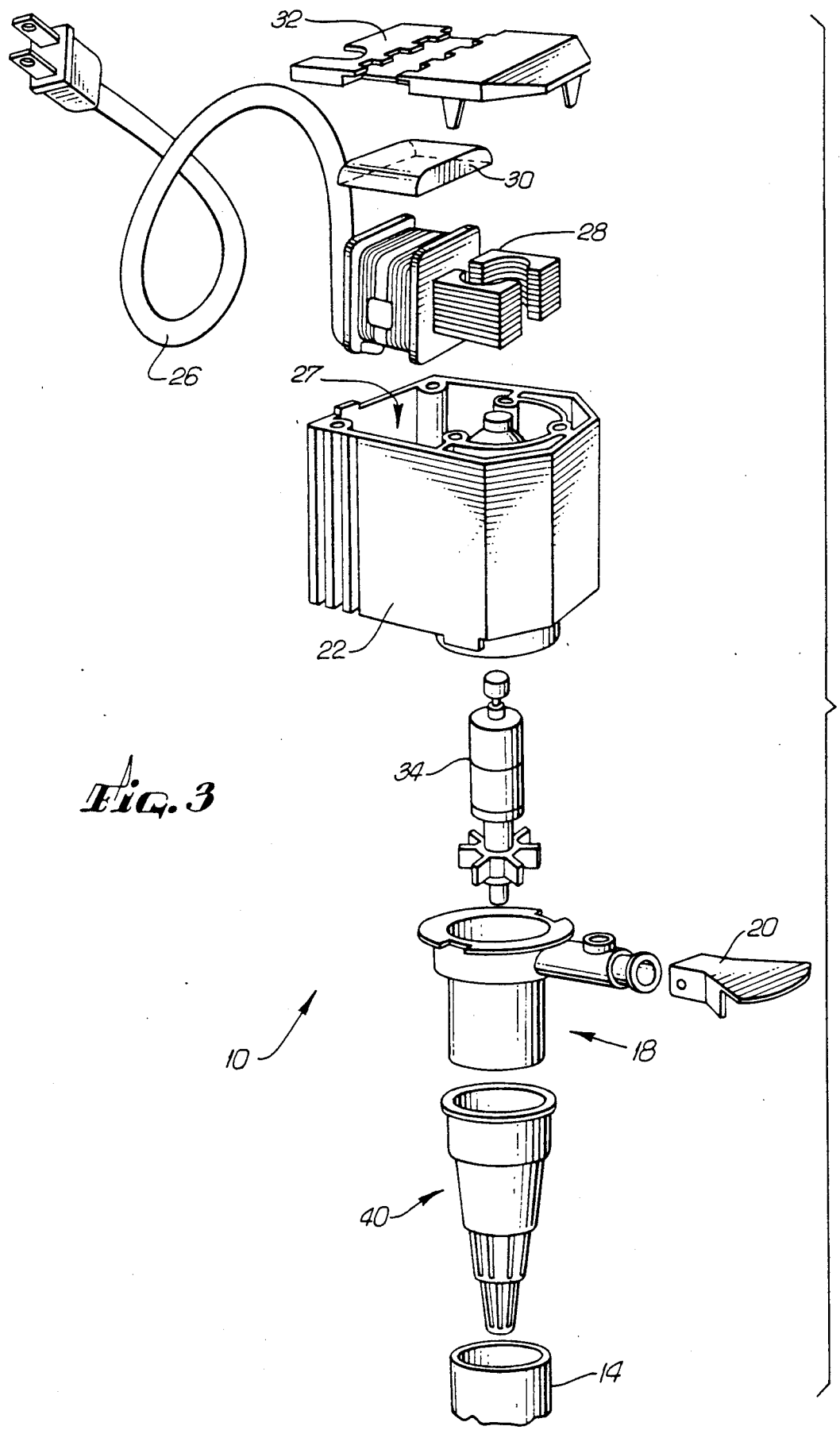
FIG. 3 shows an exploded perspective view of a submersible pump with the bubble trap of the present invention.

FIG. 3 shows an exploded perspective view of the pump 10. The coil cavity 27 contains the stator assembly 28, and is covered by a motor housing lid 32. An impeller assembly 34 slides into the motor housing from below, fitting into an open space (not illustrated) within the stator assembly. An impeller housing 18 is attached to the bottom side of the motor housing and thereby keeps the impeller assembly in its proper position within the motor housing. An intake tube adapter 40 mates the intake tube 14 to the impeller housing 18.

During assembly, the stator assembly 28 is placed within the coil cavity 27 of the motor housing and the pottant material, such as epoxy, is poured into the coil cavity. After the epoxy is approximately ⅛ inch over the top edge of the stator assembly, the bubble trap is placed on top of the epoxy material. Additional epoxy material is then added on top of the bubble trap up to the top edge of the coil cavity. The epoxy sealant material hardens and forms a water-tight seal. The motor housing lid may then be attached to the motor housing.

Other methods of assembly may also be used, although preferred methods will ensure that at least a ⅛ inch layer of pottant material is in place above the stator assembly. For example, the bubble trap may be attached to the stator assembly, the stator assembly and bubble trap may then be placed in the coil cavity, and the sealant material poured over them into the cavity. Alternatively, the stator assembly may first be placed in the coil cavity, the bubble trap placed over the top of the stator assembly, and the sealant material then poured into the cavity. All of these methods have been found to be acceptable.

If bubbles form in the epoxy sealant material, the bubble trap 30 will help prevent the formation of a complete path of bubbles from the coils to the outside surface of the epoxy. Many different materials are suitable for use as the bubble trap. For example, materials such as plastic, metal, rubber, and cardboard are all acceptable bubble trap materials. The necessary characteristic of the suitable materials is that they prevent the passage of bubbles in the sealant material toward the outside atmosphere while the sealant material is curing. Such a bubble trap prevents the formation of a bubble trail in the cured sealant that might otherwise allow moisture to work its way through the sealant material to the coils. Thus, the bubble trap is especially suited to use with submersible pumps. The bubble trap of the present invention also may be advantageously applied to pumps that will not be submerged, providing an extra measure of insulation from outside elements. With or without submerging, the bubble trap improves product safety and quality and reduces production rejects, thereby improving production time and efficiency.

What is claimed is:

1. A bubble trap for electric motors that include a motor housing with a cavity, a stator assembly received within the cavity, and a sealant material filling the cavity space between the stator assembly and the motor housing, thereby preventing moisture from reaching the coils of the stator assembly, wherein:

the bubble trap comprises a non-porous generally planar raised dome that fits in the cavity, is located substantially within the sealant material, and extends laterally across the cavity over the cross-sectional area of the stator assembly.

2. A submersible electric motor having a motor housing with a coil cavity and a stator assembly having electric coils received within the cavity, wherein a sealant material occupies the coil cavity space between the stator assembly and the motor housing, the electric motor further comprising:

a non-porous dome located substantially within the sealant material above the coils in the motor housing cavity, said dome positioned to block the passage of bubbles from the stator assembly to the surface of the sealant material during the casting of the stator assembly within the sealant material.

3. A submersible electric motor as claimed in claim 2 further having a motor housing lid covering the coil cavity and sealant material.

4. An electric motor having a motor housing with a coil cavity and coils of a stator assembly contained within the coil cavity, wherein a sealant material fills the coils cavity space around the coils and the electric motor includes a non-porous cap means located substantially within the sealant material for preventing the formulation of a bubble pathway through the sealant material from the coils to the outside atmosphere.

5. A method for producing a submersible electric motor comprising the steps of:

placing a stator assembly within a coil cavity of a motor housing;

pouring a sealant material into the cavity so as to fill the space between the motor housing and the stator assembly up to a level below the top edge of the coil cavity;

placing a generally planar raised dome on the top surface of the sealant material above the coils of the stator assembly;

pouring a sealant material into the coil cavity over the dome up to the top edge of the coil cavity such that the dome is located substantially within the sealant material; and attaching a motor housing lid to the motor housing.

6. A method for producing a submersible electric motor comprising the steps of:

placing a generally planar raised dome on the top of a stator assembly of the motor;

placing the stator assembly and the dome in a coil cavity of a motor housing;

pouring a sealant material into the cavity over the stator assembly and the dome such that the dome is located substantially within the sealant material; and attaching a motor housing lid to the motor housing.

7. The method of claim 6 wherein:

the sealant material is poured until a layer of sealant material at least ⅛ inch thick is formed above the stator assembly and the dome.

8. A method for producing a submersible electric motor comprising the steps of:

placing a stator assembly within a coil cavity of a motor housing;

placing a generally planar raised dome, on the top of the stator assembly and within the coil cavity;

pouring a sealant material into the cavity over the stator assembly and the dome such that the dome is located substantially within the sealant material; and attaching a motor housing lid to the motor housing.

9. The method of claim 8 wherein:

the sealant material is poured until a layer of sealant material at least ⅛ inch thick is formed above the stator assembly and the dome bubble trap.

10. The motor of claim 2 wherein the dome has a curved inner surface.

11. The method of claim 6 wherein the dome has a curved inner surface.

* * * * *